Aug. 3, 1965  H. J. BUTLER  3,198,291
SELF ENERGIZING SPOT TYPE DISC BRAKES
Filed April 4, 1963  3 Sheets-Sheet 1

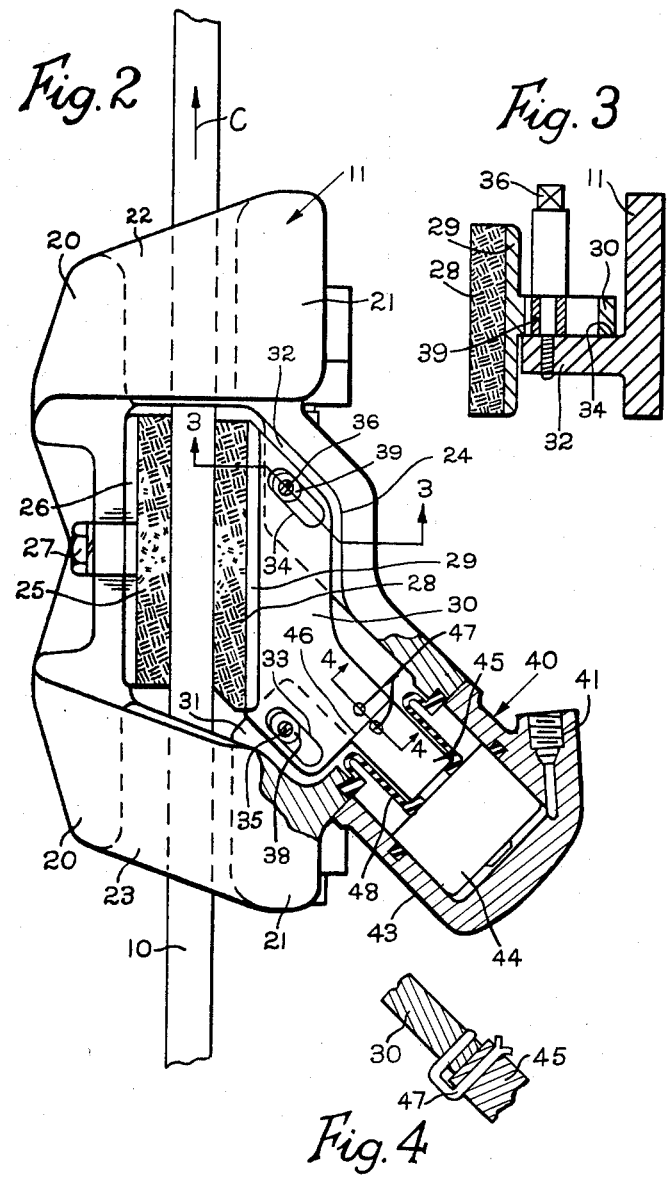

Aug. 3, 1965  H. J. BUTLER  3,198,291
SELF ENERGIZING SPOT TYPE DISC BRAKES
Filed April 4, 1963  3 Sheets-Sheet 3

Inventor:
Henry James Butler
by Benj. T. Rauber
attorney

United States Patent Office 3,198,291
Patented Aug. 3, 1965

3,198,291
SELF-ENERGIZING SPOT TYPE DISC BRAKES
Henry James Butler, Sutton Coldfield, England, assignor to Dunlop Rubber Company Limited, London County, England, a British company
Filed Apr. 4, 1963, Ser. No. 270,611
Claims priority, application Great Britain, Apr. 10, 1962, 13,890/62
14 Claims. (Cl. 188—73)

This invention relates to disc brakes and more particularly to servo disc brakes, i.e. disc brakes in which the pads of friction material are movable relative to the housing, by an associated brake-applying mechanism or mechanisms, obliquely towards the braking surfaces of the disc in the normal direction of rotation thereof adjacent the pads, to provide a servo or self-wrapping effect.

The object of the present invention is to provide improvements in brakes of this kind.

According to the present invention a disc brake of the kind described comprises a pad of friction material secured to a member which is movable relative to the housing in a direction obliquely to the surface of the disc by means of an arrangement of one or more oblique cam slots and followers associated with said member and said brake housing.

The meaning of the term "slot" as used in this specification is intended to include obvious mechanical equivalents, for example a "groove" or a "channel."

Preferably, a disc brake in accordance with the invention comprises a friction pad assembly consisting of a pad of friction material secured to a backing plate, said backing plate being movable obliquely relative to the housing by means of an arrangement of at least two oblique cam slots and followers associated with said backing plate and said housing.

In a preferred construction the caliper is provided on at least one side of the disc with cam followers in the form of a pair of pins each extending parallel to the disc and approximately parallel to the mean radial direction of the portion of the disc adjacent the friction pad. The associated pad backing plate is provided with a pair of oblique cam slots which locate the plate on the pins so that when axially-inward pressure is applied to the pad, to apply the brake, the pad is constrained to move obliquely in the direction of rotation of the disc.

The pins may be constituted by the circular-cross-section shanks of bolts secured to the non-rotatable structure, the shanks of the bolts being stepped in diameter to provide shoulders to limit the radial movement of the pad backing plate. As a preferred alternative to relying on direct engagement between the shanks of the bolts and the sides of the cam slots to guide the pads, the bolts may be provided with parallel-sided bushes, for example of oblong cross-section, to engage the sides of the cam slots.

The brake-applying mechanism may comprise a piston and cylinder mechanism attached to the non-rotatable structure on the same side of the disc as the obliquely movable pad, the non-rotatable structure being provided with a friction pad secured to the structure on the opposite side and being movable axially to enable reaction set up between the structure and the disc upon engagement of the obliquely movable pad with the disc to force the friction pad secured to the structure into engagement with the disc. This arrangement is particularly suitable for the rear brake of a motor vehicle. The thrust may be applied either obliquely, i.e. parallel to the cam slots, or axially of the disc, for example by the use of a rocking thrust member interposed between an axially-aligned piston and the friction pad backing plate as described in more detail in the specification of our co-pending U.K. patent application No. 40,346/62.

Alternatively, the brake according to the invention may comprise a pair of friction pad asemblies, one on each side of the disc, both assemblies being guided for oblique movement towards the disc by cam slots and followers as defined above, and a pair of brake-applying mechanisms associated with each pad assembly. This arrangement is particularly suitable for the front brakes of a motor vehicle.

The cam slots need not necessarily be associated with the friction pad backing plate, i.e. with the plate interposed between the pad and the brake-applying mechanism. For example the pad may be detachably secured, at one or both end edges, to a member incorporating either a cam or a cam slot which engages a cam slot or cam, as the case may be, associated with the edge of the aperture in the housing.

Two embodiments of the invention will now be described with reference to the accompanying drawings, in which:

FIGURE 2 is a plan view, partly in cross-section of the disc brake, part of which is shown in FIGURE 1;

FIGURE 3 is a scrap cross-sectional view, taken on the line 3—3 of FIGURE 2;

FIGURE 4 is a scrap cross-sectional view, taken on the line 4—4 of FIGURE 2;

Figure 1:
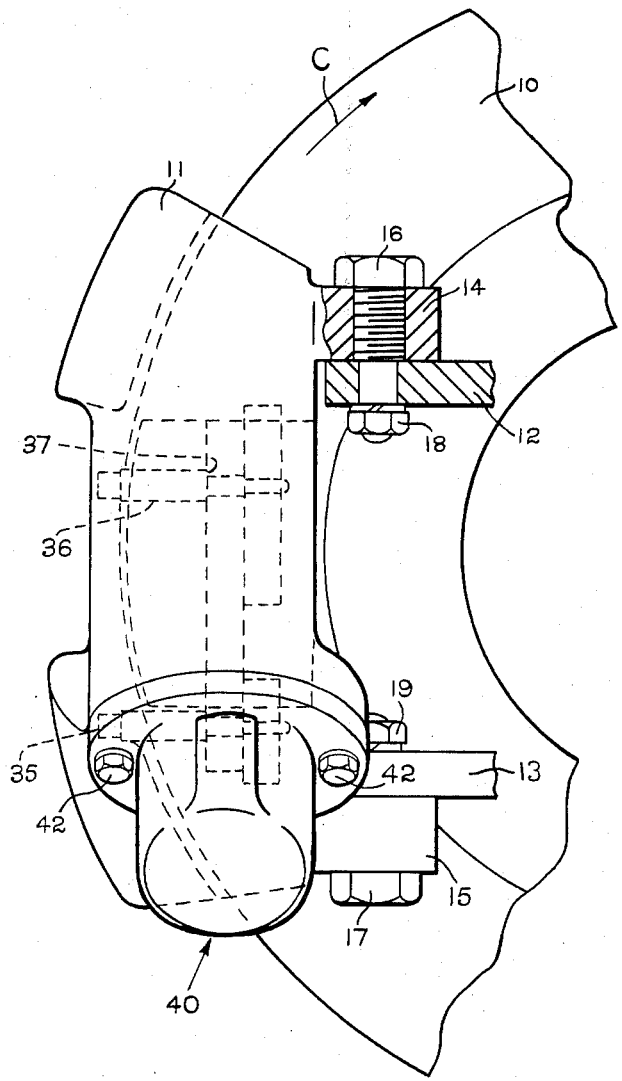
FIGURE 1 is a diagrammatic axial end view, partly in cross-section, of part of a disc brake according to the invention.
Figure 5:
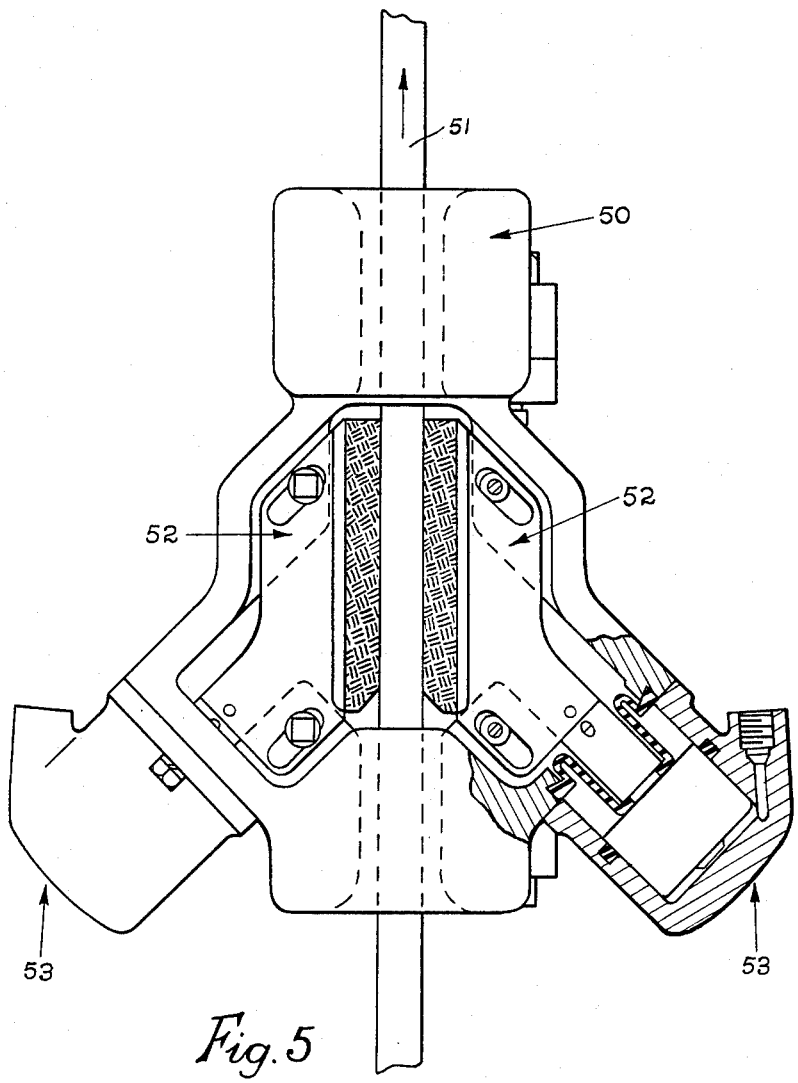
FIGURE 5 is a similar view to FIGURE 2 showing an alternative disc brake construction in accordance with the invention.

The disc brake shown in FIGURES 1–3 comprises a disc 10 secured to a rotatable wheel hub (not shown) and a non-rotatable structure in the form of a caliper-type housing 11 secured to a non-rotatable part of the vehicle by means of a pair of links 12, 13 pivotally attached to lugs 14 and 15 respectively by means of pivot screws 16, 17 and nuts 18, 19 respectively. The links are similarly pivotally secured to the non-rotatable part of the vehicle (not shown).

The housing 11 is thus free to move, without tilting, in the axial direction of the disc. In order to centralise the housing with respect to the disc, resilient bushes or similar means may be incorporated in the link pivots, but this is not essential.

The housing 11 comprises two limbs 20 and 21, on opposite sides of the disc, which are joined by bridging portions 22 and 23. An aperture 24 is formed in the radially outer portion of the housing, between the portions 22 and 23 to facilitate replacement of worn friction pads.

A friction pad 25, having a backing plate 26 is secured rigidly to the limb 20 by a bolt 27 passing through a hole drilled in the limb 20 and screwed into a screw-threaded hole in the backing plate 26.

A friction pad 28 associated with the limb 21 is mounted on a backing plate 29 having a web groove 30 extending perpendicularly to the plane of the friction face of the pad and perpendicularly to the mean radial direction of the portion of the disc adjacent the pad. The limb 21 is provided with lugs 31 and 32 having flat upper surfaces on which the web portion 30 is slidable. The web portion 30 is provided with a pair of parallel slots 33 and 34, which act as cam slots to locate the pad assembly on a pair of cam followers formed by bolts 35, 36 screwed into screw-threaded holes in the lugs 31, 32 respectively. The shanks of the bolts 35, 36 are stepped in diameter to provide shoulders 37 (see FIGURE 1) to limit the radial movement of the pad backing plate 29, and are provided with bushes 38, 39 of oblong cross-section to engage, respectively, the sides of the slots 33, 34.

The arrangement of cam slots and cam followers described above guides the pad 28 so that it is movable obliquely relative to the disc 10, in the normal direction of rotation of the disc as indicated by the arrow "C."

A brake-applying mechanism in the form of a hydraulic piston and cylinder mechanism 40, which may be supplied with pressurised fluids from a conventional master-cylinder through a connection 41, is fastened to the housing 11 by bolts 42. The axis of the cylinder 43 of the brake-applying mechanism is aligned with the direction in which the pad assembly is movable. The piston 44 of the mechanism 40 is provided with a connecting rod 45 rigidly fixed to the piston and abutting a surface 46 of the web portion 30 of the pad backing plate 29 to transmit the thrust from the mechanism 40 to the pad assembly. The connecting rod 45 and the web portion 30 are drilled at points adjacent to their abutting surfaces and are held together by a U-shaped link 47 the limbs of which pass through the drilled holes. A convoluted rubber seal 48 is provided between the connecting rod 45 and the housing 11 to prevent the intrusion of dirt or moisture into the cylinder 43.

In operation of the disc brake described above, the hydraulic brake-applying mechanism 40 is operated to apply a thrust to the friction pad 28. The pad 28 moves obliquely towards the disc, and assuming the disc to be rotating in the direcion of the arrow C, as soon as frictional contact is established between the pad 28 and the disc the disc tends to drag the pad in the circumferential direction. The drag exerted on the pad 28 sets up a reaction, or wedging action, between the cam followers fixed to the housing and the cam slots which forces the pad towards the disc with an enhanced pressure.

The resultant pressure exerted on the friction pad 28 is accompanied by an equal reaction on the housing 11 which causes the housing to move axially and to press the pad 25 into contact with the opposite side of the dic.

When the pad 28 becomes due for replacement, it is only necessary to remove the bolts 35, 36. The pad and backing plate can then be withdrawn through the aperture 24. Similarly, the pad 25 can be withdrawn after removing the bolt 27.

In the alternative disc brake shown in FIGURE 4, the housing 50 is fixed both axially and circumferentially relative to the disc 51, and incorporates an obliquely guided friction pad assembly 52 and an associated brake-applying mechanism 53 on each side of the disc. The construction of each pad assembly and brake-applying mechanism is identical with that of the pad assembly 28, 29 and brake-applying mechanism 40 described above.

The disc brake shown in FIGURE 4 may provide a greater braking effect than that shown in FIGURES 1–3, since each pad assembly is subjected to enhanced braking pressure resulting from the drag of the rotating disc on the friction pad, converted to an axial thrust by reaction against the cam slot and cam follower arrangement. On the other hand the brake shown in FIGURES 1–3 is cheaper to produce and more compact.

For the above reasons it is considered that the brake shown in FIGURES 1–3 is particularly suitable for use as a rear brake on a motor vehicle, and the brake shown in FIGURE 4 is particularly suitable for use as a front brake.

Having now described my invention, what I claim is:

1. A disc brake which comprises a disc rotatable on a central axis, a housing having a pair of limbs spaced to define a channel for the braking surfaces of said disc, a pair of friction elements, one on each side of said disc, and supported by an adjacent limb, the limb and its associated friction element on at least one side of said disc having sidewise extensions in relative sliding association on a plane normal to a radius of said disc, one of said relatively slidable extensions having a pair of parallel cam slots oblique to the plane of said disc, and a pair of cam followers on the other extension one slidable in one of said cam slots and the other slidable in the other of said cam slots to guide and support said friction element in movement oblique to the plane of said disc and an actuating means acting between and in a direction parallel to said slots to move said friction element toward frictional contact with said disc.

2. The disc brake of claim 1 in which the limbs on both sides of said disc have extensions and the friction elements on each side of said disc have extensions slidably associated with the extensions of said limbs with one of each pair of said extensions having a pair of parallel cam slots oblique to the plane of said disc and the extension slidably associated therewith having a cam follower slidable in said slots.

3. A disc brake according to claim 1 in which said friction element comprises a pad of friction material and a backing plate on which said pad is secured, said backing plate comprising said extension of said friction element.

4. A disc brake according to claim 1 wherein said obliquely movable friction element is provided on one side of the disc only, the housing being circumferentially fixed and axially movable relative to the disc and having a friction pad secured to the housing on the side of the disc remote from the obliquely movable friction pad assembly whereby reaction set up between the disc and the housing upon engagement of the obliquely movable friction pad assembly with the disc acts to force the friction pad secured to the housing into engagement with the disc.

5. A disc brake according to claim 3 wherein said oblique cam slots are formed in the pad backing plate and the cam followers comprise pins rigidly secured to the housing.

6. A disc brake according to claim 5 wherein the pins are constituted by the shanks of bolts secured to the housing, the shanks of the bolts being stepped in diameter to provide shoulders to limit the radial movement of the pad backing plate.

7. A disc brake according to claim 3 wherein the pad backing plate of the obliquely movable friction pad assembly is provided on its side remote from the friction pad with a web portion extending substantially perpendicularly to the plane of the friction face of the pad, said slots being formed in the web portion.

8. A friction element and mounting assembly for a disc brake which comprises a housing having a pair of limbs spaced to define a channel for the braking surfaces of a brake disc, a pair of friction elements, one carried on each said limb, the limb and its associated friction element on at least one side of said channel having sidewise extensions in relative slidable association on a plane normal to the radius of a disc in said channel, one of said relatively slidable extensions having a pair of parallel cam slots oblique to the plane of said disc, and a pair of cam followers on the other extension one slidable in one of said cam slots and the other slidable in the other of said cam slots to guide and support said friction element in movement oblique to the said channel, said friction elements having a part to receive the thrust of a brake actuating member on a line of force parallel to and between said slots.

9. The assembly of claim 8 in which said cam slot is in the extension of said friction element and said cam follower is fixed on the extension of said limb.

10. The assembly of claim 9 in which said extension of said friction element is a web having a surface normal to a radius of a disc in said channel and has a pair of parallel slots oblique to the plane of said channel and in which said extension of said limb has a cam follower in each of said slots.

11. The assembly of claim 9 in which said cam follower comprises a parallel sided bushing for engagement with the sides of said slot and a pin passing through said bushing and threaded in the extension of said limb and stepped to a larger diameter to form a shoulder overlying said bushing to hold said bushing against radially outward movement.

12. The assembly of claim 8 in which said limbs and extensions have an opening through which said friction element may be removed in a radial direction and replaced.

13. The assembly of claim 8 comprising means to move said friction element in the direction of said slots.

14. The assembly of claim 13 in which said means to move said friction element comprises a piston and cylinder secured to said friction element to move said element in the direction of said cam slots.

References Cited by the Examiner

UNITED STATES PATENTS

| | | | |
|---|---|---|---|
| 1,906,733 | 5/33 | Bendix | 188—72 |
| 1,972,288 | 9/34 | Brewster | 188—7 |
| 2,037,455 | 4/36 | Bowen. | |
| 2,533,186 | 12/50 | Bricker et al. | 188—73 |
| 2,957,553 | 10/60 | Chouings et al. | 188—73 |
| 3,065,829 | 11/62 | Bessler et al. | 188—73 |
| 3,089,565 | 5/63 | Butler | 188—73 |

FOREIGN PATENTS

| | | |
|---|---|---|
| 1,019,873 | 11/57 | Germany. |
| 788,841 | 1/58 | Great Britain. |

MILTON BUCHLER, *Primary Examiner.*

EUGENE G. BOTZ, ARTHUR L. LA POINT,
*Examiners.*